April 4, 1967 J. C. GARRETT 3,312,927

INTERCEPT STRAPPING BRIDGE

Filed Nov. 12, 1964

INVENTOR.
Jim C. Garrett

BY [signature]

ATTY.

United States Patent Office 3,312,927

Patented Apr. 4, 1967

3,312,927

INTERCEPT STRAPPING BRIDGE

Jim C. Garrett, Huntington Park, Calif., assignor to Automatic Electric Laboratories, Inc., Northlake, Ill., a corporation of Delaware

Filed Nov. 12, 1964, Ser. No. 410,589
1 Claim. (Cl. 339—17)

This invention relates in general to an improved intercept strapping bridge and more specifically to a strapping bridge by means of which a telephone line leading from an exchange, from which the telephone has been disconnected or moved to a new location, may be readily cross-connected to an intercept operator.

It is common practice in telephone systems to provide a terminal block in the exchange assigned to each telephone line, each block having a row of double-ended terminals usually six in number, with three of the terminals connected on one side to the line leading to the switching equipment of the exchange and on the other side to the telephone assigned to that line. The other three terminals of the block are connected on the lower side to the intercept operator's position and are normally free of connections on the other side. When a subscriber's telephone is moved from one location to another or disconnected from service, the line leading to the telephone is disconnected from the upper side of the block and the three terminals are connected to the other three terminals leading to the operator so that subsequent calls to that number will be routed automatically to the operator so that proper information may be given to the party calling.

The improved strapping bridge disclosed herein is in the nature of an improvement over the bridge disclosed in application Ser. No. 252,247 filed Jan. 17, 1963, now Patent No. 3,138,417. The present bridge has several features of improvement over that shown in the prior application, namely, the bridge, when mounted upon the terminal block lies wholly within the vertical dimensions of the block terminals so that it is not easiy dislodged and does not interfere with operations on adjacent terminals such as soldering or unsoldering wires thereto or therefrom. Also the individual contacts of the bridge which engage the block terminals are split to provide multiple contact with the terminals and have a plurality of nibs or raised portions opposite the spring portions to provide better contact with the terminals. Other features of improvement will be apparent from the following detailed description having reference to the accompanying drawings in which:

Figure 1:
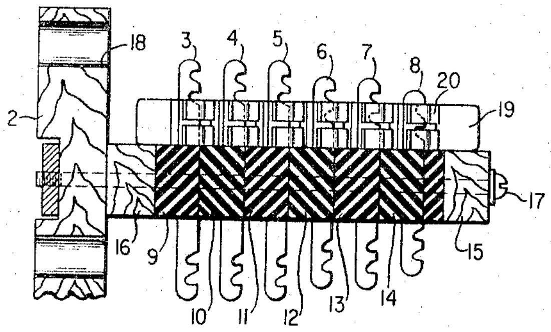
FIG. 1 is a view of the terminal block partly in section showing one row of the terminals thereof with the strapping bridge in position thereon.

Referring to FIG. 1, there is shown a terminal block comprising fanning strip 2 with one row of terminals 3 to 8 mounted in slots in insulating strips 9 to 14 which are held in place between wood strips 15 and 16 by bolts such as 17. There are a number of such rows of terminals mounted back of single one shown; the one row illustrated represents the terminals assigned to one telephone line. The rows of terminals are mounted very close together to conserve space and jumper wires are normally passed through holes such as 18 for connection to the terminals. In this figure the strapping bridge 19 is shown in engagement with the terminals extending above the terminal block. It will be noted that the bridge is of a width to expose the upper prongs of the terminals 3 to 8.

Figure 3:
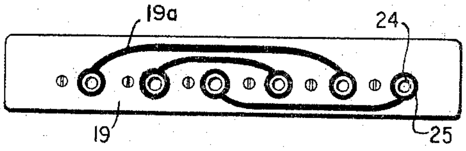
FIG. 3 is a back view of the bridge showing printed circuit links by which the contact springs on the opposite side of the bridge are connected together in pairs.
Figure 2:
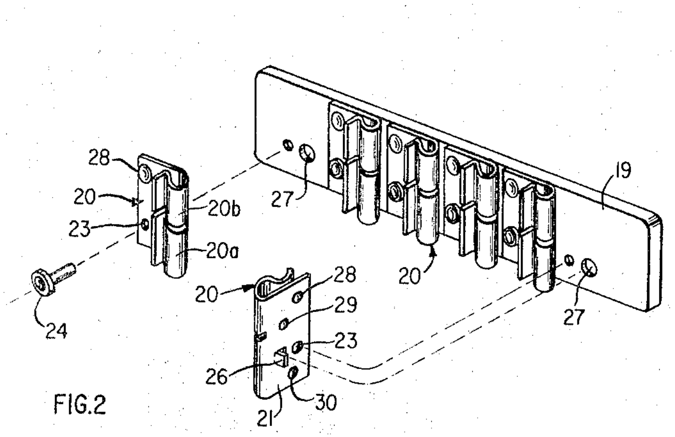
FIG. 2 is a perspective view of the strapping bridge with two of the contact springs thereof shown disconnected therefrom and the rivet for securing the spring to the bridge.

Referring now to FIGS. 2 to 6, inclusive, the bridge comprises a plate 19 of insulating material having a series of contact springs 20 riveted to the front side thereof as shown in FIG. 2 and having a printed circuit **19*a* on the rear side thereof as shown in FIG. 3. The rivets, such as 24, which hold each contact spring in place on the front of the plate, form a connection to a point of the printed circuit at points such as 25** (FIG. 3).

Figure 4:
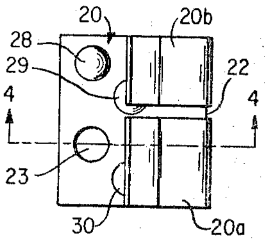
FIG. 4 is a front view (enlarged) of one of the contact springs of the bridge.
Figure 5:
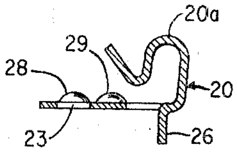
FIG. 5 is a sectional view of the contact spring of FIG. 4 taken along lines 4—4 of that figure.

As shown in FIGS. 4 and 5, each contact spring is formed of a single piece of conductive metal with one side bent up and around in a generally V-shape as shown at **20*a* and with a saw slot 22 cut through the bent up portion of the spring and extending downward to the flat part 21 of the spring. This saw slot provides two independently flexible sections 20*a* and 20*b* as shown in FIGS. 2 and 4. The flat portion 21 of each terminal is provided with a mounting hole 23 through which the rivet or eyelet 24 is inserted to mount the spring on the plate and make connection at 25 with a point in the printed circuit on the back of the plate. As shown in FIGS. 2 and 4, the hole 23 is laterally displaced from the saw cut 22 so as to be positioned opposite and slightly forward of the free end of flexible section 20*a*, whereby the head of the rivet 24 in addition to securing the contact spring to the board 19 forms a point of contact with the side of the terminal opposite flexible section 20*a*. Adjacent and to rear of the hole 23 a small section of the flat portion 21 is punched-out to provide a lug 26 which depends from the flat portion (best seen in FIG. 5) and registers with a hole such as 27 in the plate 19 (FIG. 2) to prevent twisting movement of the spring when riveted in place. The flat part of each spring 20 is further provided with three nibs or bosses 28, 29 and 30 shown clearly in FIGS. 4 and 5. Bosses 28 and 29 are disposed generally opposite flexible portion 20*b* of the spring and boss 30 and the head of rivet 24 when the contact is assembled to the board are disposed opposite flexible portion 20*a* to provide additional points of contact with each of the terminals 3–8** when the bridge is set in place as in FIG. 1.

Figure 6:
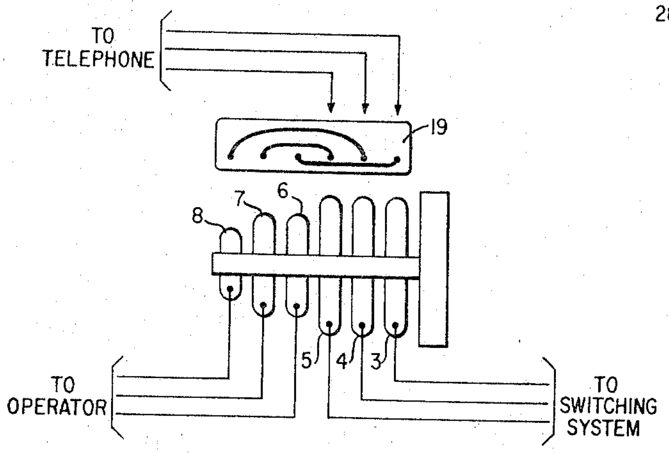
FIG. 6 is a diagrammatic view of the terminal block with its connections, and the strapping bridge shown in relation thereto.

It will thus be seen that when it is desired to connect a disconnected telephone line to the intercept operator, the bridge 19 is pressed to terminals 3 to 8 as shown in FIG. 1 with each terminal passing under the bent-over ends **20*a* and 20*b* of its associated spring and bearing against the bosses or nibs 28, 29 and 30 and the rivet head 24 to insure good contact. More specifically, the spring portions 20*a* and 20*b* engage one side of a terminal and the three nibs and the rivet head engage the opposite side, thereby providing six possible points of contact and insuring electrical connection. Also it will be seen that the bridge as a whole, when pressed on the terminals 3 to 8, is so narrow relative to the height of the terminal that its upper edge lies below the upper ends of the terminals as clearly shown in FIG. 1 so that it does not interfere with operations of soldering or unsoldering the jumper wires from adjacent terminals and is not readily dislodged from its position. FIG. 6 shows diagrammatically how the bridge 19 with its printed circuit links 19*a* connects the three terminals 3, 4 and 5 to the terminals 6, 7 and 8** to connect the leads from the switching system to the operator when the upper leads to the telephone line have been disconnected.

Having fully described the features and aspects of the invention, what is considered to be new and desired to have protected by Letters Patent will be pointed out in the appended claim.

I claim:

A terminal connector for use in conjunction with a terminal block having a plurality of rows of generally parallel terminals projecting therefrom, said connector comprising an elongated insulating mounting plate, a plurality of longitudinally spaced spring contacts mounted on said plate, and printed circuit means on said plate on the side opposite said contacts interconnecting certain of said spring contacts for electrically interconnecting certain of said terminals when said spring contacts are engaged therewith, said mounting plate and said spring contacts having a height less than the height of the terminals whereby the spring contacts may be engaged with the terminals below the upper ends thereof thereby enabling the upper ends of the terminals to be accessible and also enabling adjacent terminals to be accessible, each of said spring contacts including a generally U-shaped spring member in the form of a flat spring, one leg of said spring being longer than the other and disposed against the surface of the mounting plate, a rivet extending through a hole in the free end of the longer leg of the U-shaped spring and through the board for electrically connecting the printed circuit with the spring contact, the shorter leg of said spring being formed with two independently flexible sections generally converging towards the longer leg and forming two distinct points of contact for engaging one side of the terminal, said longer leg having a pair of bosses disposed generally opposite one of said flexible sections and at least one other boss disposed generally opposite the other of said flexible sections for electrically contacting the other side of said terminal, said rivet-receiving hole in the longer end of said spring being disposed generally opposite said other flexible section, the longer leg of said spring having a punched out lug adjacent said rivet-receiving hole, said lug being inserted in a hole in said mounting plate to prevent twisting action of the spring.

References Cited by the Examiner

UNITED STATES PATENTS

| | | | |
|---|---|---|---|
| 2,434,211 | 1/1948 | Hull et al. | 339—220 X |
| 2,668,279 | 2/1954 | Epstein | 339—220 X |
| 2,849,700 | 8/1958 | Perkin | 339—150 X |
| 3,181,109 | 4/1965 | Snider | 339—150 X |
| 3,192,498 | 6/1965 | Ruhlemann | 339—258 X |
| 3,235,829 | 2/1966 | Haefele | 339—258 X |

FOREIGN PATENTS

| | | |
|---|---|---|
| 638,237 | 3/1962 | Canada. |

MARVIN A. CHAMPION, *Primary Examiner.*

ALFRED S. TRASK, *Examiner.*